United States Patent [19]
Kojima

[11] Patent Number: 5,128,942
[45] Date of Patent: Jul. 7, 1992

[54] METHOD OF AND APPARATUS FOR TRANSMITTING VIDEO DATA

[75] Inventor: Yuichi Kojima, Kanagawa, Japan

[73] Assignee: Sony Corporation, Tokyo, Japan

[21] Appl. No.: 509,331

[22] Filed: Apr. 13, 1990

[30] Foreign Application Priority Data

Apr. 20, 1989 [JP] Japan .................. 1-101254

[51] Int. Cl.[5] .............................. G06F 11/10
[52] U.S. Cl. ................................. 371/5.5; 371/43
[58] Field of Search ............ 371/5.5, 43; 455/10, 455/22, 63

[56] References Cited

U.S. PATENT DOCUMENTS

| | | | |
|---|---|---|---|
| 3,078,443 | 2/1963 | Rose | 371/41 |
| 3,496,549 | 2/1970 | Tong | 371/41 |
| 3,534,264 | 10/1970 | Blasbalg et al. | 371/5.5 |
| 3,945,549 | 7/1990 | Simon et al. | 371/43 |
| 3,988,677 | 10/1976 | Fletcher et al. | 371/37.5 |
| 4,047,151 | 9/1977 | Rydbeck et al. | 371/41 |
| 4,261,054 | 4/1981 | Scharla-Nielsen | 371/5.5 |
| 4,701,923 | 10/1987 | Fukasawa et al. | 371/41 |
| 4,744,083 | 5/1988 | O'Neill et al. | 371/43 |
| 4,939,731 | 7/1990 | Reed et al. | 371/32 |

FOREIGN PATENT DOCUMENTS 1478736 7/1977 United Kingdom.

*Primary Examiner*—Charles E. Atkinson
*Attorney, Agent, or Firm*—Limbach & Limbach

[57] ABSTRACT

According to the present invention, when video data of, for example, a real moving picture is transmitted, the video data is data-compressed and transmitted while the combination of the compressing ratio of the video data and the encoding ratio of the video data is varied in response to a condition of the transmission path. Therefore, regardless of the condition of the transmission path, video data of the best quality can be transmitted at a constant transmitting speed.

4 Claims, 2 Drawing Sheets

FIG. 1

| Code $(n_0, k_0)$ \ Q | (2,1) | (3,2) | (4,3) |
|---|---|---|---|
| 2 | 3.1 | 2.7 | 2.3 |
| 4 | 4.8 | 4.5 | 4.1 |
| 8 | 5.3 | 4.8 | 4.6 |
| $\infty$ | 5.5 | 5.0 | 4.8 |

(Unit: dB)

FIG. 3

| | Group | I | II | III | IV |
|---|---|---|---|---|---|
| 2 | Data Amount N [Mbps] | 12 | 16 | 18 | 21 |
| 3 | Data Compressing Ratio C | 1/2 | 1/3 | 1/4 | 1/8 |
| 4 | Code $(n_0, k_0)$ | (2,1) | (3,2) | (4,3) | (8,7) |
| 5 | Encoding Ratio R | 1/2 | 2/3 | 3/4 | 7/8 |
| 6 | Encoding Gain | Large ← | | | → Small |
| 7 | Image Quality | Low ← | | | → High |
| 8 | Transmission Condition (Weather) | Bad (Rainfall) ← | | | → Good (Fine) |

METHOD OF AND APPARATUS FOR TRANSMITTING VIDEO DATA

BACKGROUND OF THE INVENTION

1. Field of the Invention

The present invention relates to a method and apparatus for transmitting video data.

2. Description of the Prior Art

In general, when a video signal (a television signal) is transmitted via a communication satellite, a frequency band of higher than 10 GHz is used. Radio waves of such a high frequency band are considerably attenuated by rainfall. In transmitting a video signal through a communication satellite, an FM modulation scheme is generally employed. However, if the signal level of the FM signal is attenuated to become lower than a threshold carrier-to-noise (C/N) ratio, the quality of the reproduced picture deteriorates rapidly. Accordingly, when the video signal is transmitted through the communication satellite, it is necessary to make up some suitable counterplan for bad weather such as rainfall or the like. In this connection, a serviceability of higher that 99.9% is requested in the case of bad weather.

In that case, if a direct broadcast by satellite (DBS) is performed between stationary stations, the image quality of the picture can be prevented from being deteriorated by increasing the transmission output. However, when the broadcasting station transmits a video image to its own station from a spot covered via a communication satellite, if the transmission output is increased, then not only the transmitter but also the power supply source apparatus or the like must be enlarged in size and increased in weight. Therefore, an increase of the transmission output is not desirable.

When, on the other hand, a video signal is digitized to perform the DBS, 4-phase shift keying (PSK) is frequently used as the modulation system. When the 4-phase PSK is employed, the attenuation of the signal by rainfall or the like can be avoided by switching it to a 2-phase PSK.

According to this method, however, the signal band is widened in the 2-phase PSK so that an expensive frequency band of the communication satellite must be increased. This is described in an article by Y. Yasuda et al., "THEORTICAL BIT ERROR RATE PERFORMANCE OF SOFT DECISION VITERBI DECODING,"*Transaction of the Institute of Electronics Information and Communication Engineers*, No. CS80–126, pp. 31 to 46, Sep. 24, 1980.

As described above, when the video signal is transmitted via the communications satellite, the image quality of the received picture is deteriorated by rainfall or the like. In order to remove this disadvantage, the prior art apparatus must be made large-sized, heavy in weight or complicated in construction. Alternatively, the signal band is widened.

OBJECTS AND SUMMARY OF THE INVENTION

Therefore, it is an object of the present invention to provide an improved method and apparatus for transmitting video data in which the above-mentioned defects can be eliminated.

More specifically, it is an object of the present invention to provide a method and apparatus for transmitting video data in which the best image quality can be obtained for any given transmitting condition.

It is another object of the present invention to provide a method and apparatus for transmitting video data in which the worst cases where an apparatus cannot be operated due to bad weather such as a rainfall or the like can be avoided.

It is a further object of the present invention to provide a method and apparatus for transmitting video data in which the apparatus can be reduced in size.

The present invention obtains these objects by a method and apparatus for transmitting data by compressing the data, convolutionally encoding the compressed data, transmitting the convolutionally encoded, compressed data at a predetermined speed, receiving the convolutionally encoded, compressed data, Viterbi decoding the convolutionally encoded compressed data, and expanding the Viterbi decoded data, wherein the combination of the compressing ratio and the encoding ratio of the data is varied while the transmitting speed of the data is maintained constant.

The above, and other objects, features and advantages of the present invention, will be apparent in the following detailed description of a preferred embodiment of the invention when read in conjunction with the accompanying drawings, in which like reference numerals are used to identify the same or similar parts in the several views.

BRIEF DESCRIPTION OF THE DRAWINGS

FIG. 1 is a diagram of an example of an encoding gain, and to which reference will be made in explaining the present invention;

FIG. 3 is a table used to explain the operation of the present invention.

DETAILED DESCRIPTION OF A PREFERRED EMBODIMENT

Figure 2:
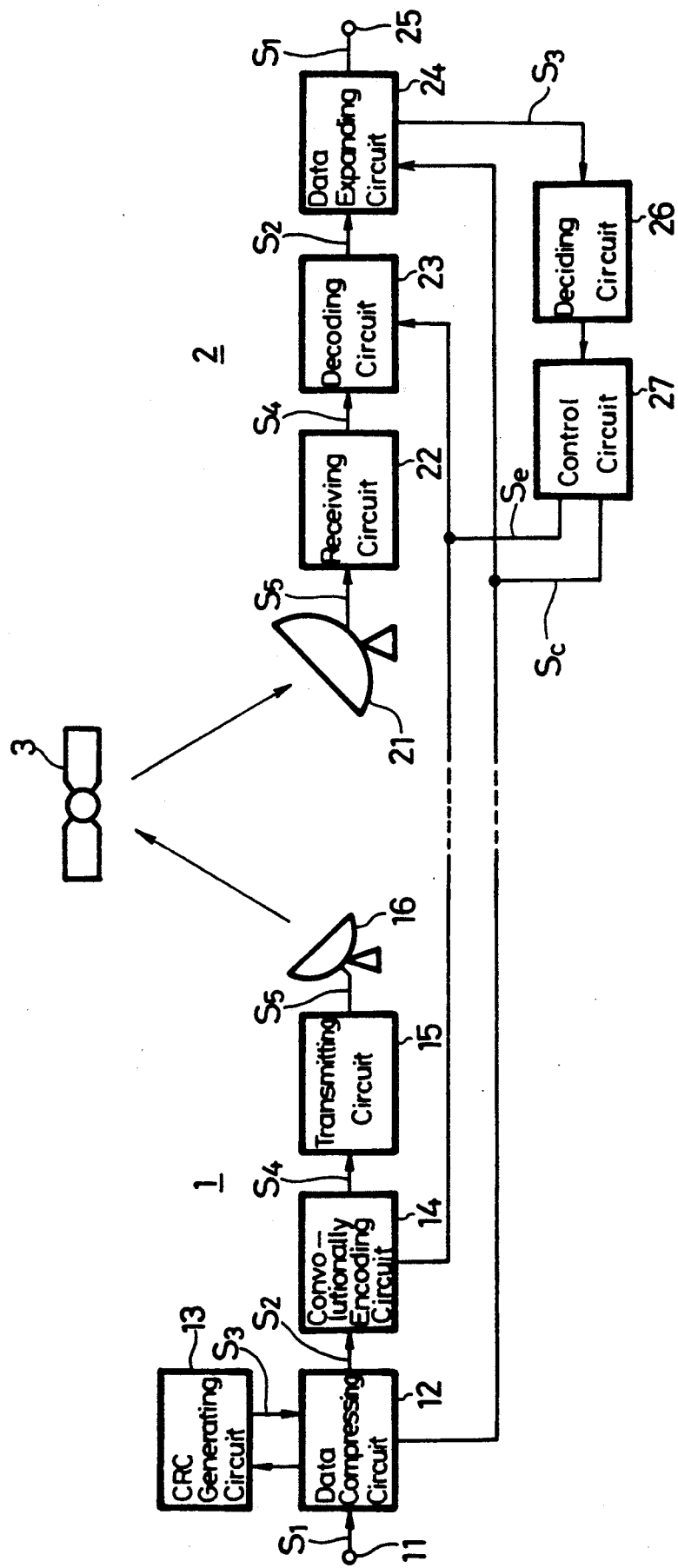
FIG. 2 is a block diagram showing an outline of an embodiment of an apparatus for transmitting video data according to the present invention.

In order to understand the present invention more clearly, let us first explain a fundamental principle of the present invention.

FIG. 1 shows an example of an encoding gain wherein values in the table of FIG. 1 are quoted from the foregoing literature, "THEORETICAL BIT ERROR RATE PERFORMANCE OF SOFT DECISION VITERBI DECODING." Referring to FIG. 1, "(4,3)" convolutional code, for example, indicates that, of the code of 4 bits, 3 bits are assigned to information bits and the remaining 1 bit is assigned to an error correcting code. More specifically, a (n0, k0) convolutional code indicates that, of n0 bits encoded, the information bit is formed of k0 bits and the error correcting bit is formed of remaining (n0 - k0) bits. Further, a value Q is a soft decision value Q.

Assuming that an encoding ratio R is expressed as R =k0 / n0 then, this equality demonstrates that, according to FIG. 1, the larger the encoding ratio becomes the encoding gain becomes larger in the convolutional code regardless of the value Q. This is equivalent to the fact that, if the encoding ratio R is increased, the gain of the transmission path is equivalently increased, whereas the attenuation of the signal (radio wave) is reduced correspondingly.

From such a standpoint, the gain of the transmission path can be equivalently changed by the encoding ratio of the convolutional encoding and using data compression in the DBS of the digital video signal, so that, according to the present invention, image data is compressed and is convolutionally encoded and is transmitted. Simultaneously, in response to the condition of the transmission path, the data compressing ratio and the convolutional encoding ratio are varied so as not to vary the transmission rate.

The embodiment of the present invention will now be described in detail hereinunder.

Referring to FIG. 2, there is provided a transmitting apparatus 1 which is located, for example, at the news source place. A receiving apparatus 2 is located, for example, at the broadcasting station and a communication satellite 3 for DBS is provided. In this embodiment, a transmission rate at which image data is transmitted from the transmitting apparatus 1 to the receiving apparatus 2 via the communication satellite 3 is selected to be 24 Mbps (Megabits per second).

As shown in FIG. 2, in the transmitting apparatus 1, a digital video signal $S_1$ input at terminal 11 is supplied to a data compressing circuit 12 which is what might be called a high efficiency encoding circuit. In that case, the digital video signal $S_1$ is formed according to a signal format which conforms, for example, to the CCIR Recommendation 601. In other words, a luminance signal is converted to a digital luminance signal by a sampling frequency of 13.5 MHz and a quantization bit number of 8 bits, whereas red and blue color difference signals are converted to digital red and blue color difference signals by a sampling frequency of 6.75 MHz and a quantization bit number of 8 bits. Thus, the digital video signal $S_1$ is a signal of 216 Mbps on the whole.

The data compressing circuit 12 data-compresses the signal $S_1$ to provide data $S_2$ according, for example, to an adaptive predictive coding system and a variable length coding system. At that time, in accordance with a control signal Sc, a data amount N after the signal $S_1$ is compressed and the data compressing ratio C are controlled to fall within any one of groups I to IV on the rows 2 and 3 in FIG. 3 where an equality of C =(P−N)/P is established. The value P in this equation represents the data amount when the reference data compression is carried out without the application of the present invention, and is selected to be equal to the transmission rate of 24 Mbps. That is, if the reference data compression is contained, the original data $S_1$ is compressed to the data $S_2$ by the compression ratio is expressed as $$\frac{24}{216} \times \frac{24 - N}{24} \text{ [Mbps]}$$

Further, a code generating circuit 13 generates, for example, a cyclic redundancy check (CRC) code $S_3$ as an error checking code, and this CRC code $S_3$ is added to the data $S_2$. In this embodiment, the aforementioned data amount N and compressing ratio C is applied to the signal which includes the code $S_3$.

The data $S_2$ to which is added the code $S_3$ is supplied to a convolutional encoding circuit 14. The convolutional encoding circuit 14 convolutionally encodes the data $S_2$ to data $S_4$ and can also vary freely the code (n0, k0) of the data $S_4$ in the convolutional encoding and the encoding ratio R to be any of those described in the groups I to IV in the rows 4 and 5, respectively, of the table of FIG. 3 in accordance with a control signal Se. In that case, if the data compression in the data compressing circuit 12 belongs to the group I, then the data compression in the encoding circuit 14 must belong to the group I. In other words, the data compressing ratio C in the data compressing circuit 12 and the encoding ratio R in the encoding circuit 14 are controlled so as to lie in the same group.

Accordingly, the transmission rate of the data $S_4$ becomes constant, for example, 24 Mbps regardless of the groups I to IV. That is, the data compressing ratio C and the encoding ratio R of each of the four groups I to IV are determined such that the transmission speed becomes constant. In this embodiment, the transmission speed is selected to be 24 Mbps so that numerals [2,3,4,8] which are factors of [24] are selected as a denominator of a fraction which indicates the data compressing ratio C and the encoding ratio R.

The data $S_4$ from the encoding circuit 14 is supplied to a transmitting circuit 15 which is comprised of a modulating circuit, a frequency converting circuit, a power amplifier and the like not shown. In the transmitting circuit 15, the data $S_4$ supplied thereto is converted, for example, to a 4-phase PSK signal $S_5$, and this signal $S_5$ is transmitted to the communication satellite 3 through an antenna 16.

The signal $S_5$, relayed by the communication satellite 3, is received by a so-called parabola antenna 21 in the receiving circuit 22 of, for example, a double superheterodyne system, in which it is demodulated to provide the data $S_4$.

The demodulated $S_4$ data is supplied to a Viterbi decoding circuit 23 and is thereby demodulated as the data $S_2$ in response to the control signal Se. The data $S_2$ is supplied to a data expanding circuit 24, in which it is expanded in response to the signal Sc to provide the original video signal $S_1$. This original video signal $S_1$ is supplied to an output terminal 25. In the foregoing, the data expanding circuit 24 is what might be called a high efficiency decoding circuit.

In that case, the data expanding circuit 24 separates and derives the CRC code $S_3$, and this CRC code $S_3$ is supplied to an error deciding circuit 26 which decides the error condition or error rate of the code $S_3$. The decided result is supplied to a control circuit 27 which derives the above-mentioned control signals Sc and Se in accordance with the decided result of the deciding circuit 26. The signal Sc, which represents a compressing ratio C, is supplied to the data compressing circuit 12 and the encoding circuit 14, whereas the signal Se, which represents an encoding ratio R, is supplied to the encoding circuit 14 and the decoding circuit 23. The circuits 12, 24 and 14, 23 are controlled by the signals Sc and Se such that, if the error rate of the CRC code $S_3$ becomes larger, a group of a lower number is selected from the groups I to IV. More specifically, when the transmission condition is good, the group IV is selected. When the transmission condition becomes worse, the groups III, II and I are selected in that order.

Although the method for supplying the control signals Sc and Se to the data compressing circuit 12 and the encoding circuit 14 from the receiving apparatus 2 is not specific, the control signals Sc and Se may be transmitted to the data compressing circuit 12 and the encoding circuit 14 via a communication network line between the television broadcast station and the news source place. Alternatively, the groups I to IV are selected by the control signals Sc and Se so that the groups I to IV selected in accordance with the control signals Sc and Se are transmitted to the transmitting side via a communication telephone to thereby determine the compressing ratio C and the encoding ratio R.

According to the above-described arrangement, when the weather condition is good, the video signal $S_1$ is transmitted by the group IV. At that time, the data compressing ratio C for the video signal $S_1$ is as small as ⅛ so that a video signal $S_1$ of good image quality can be transmitted as shown in the row 7 of FIG. 3.

When the weather condition is bad, the video signal $S_1$ is transmitted by the group I. At that time, the encoding ratio R for the video signal $S_1$ is small, i.e., the encoding gain is large as shown in the row 6 of FIG. 3 so that although the image quality is deteriorated because the data compressing ratio C is large, the video signal $S_1$ can be transmitted at any rate. Therefore, it is possible to avoid the worst cases where the transmitting apparatus cannot be operated at all. If the weather condition becomes fine, the group is changed from the group I to the group II or the group III or IV is selected, then the image quality becomes better.

As described above, according to the present invention, since the video signal is data-compressed and convolutionally encoded and then transmitted with the various combination of the data compressing ratio C and the encoding ratio R in response to the transmission conditions at that time, the best image quality can be obtained under the above-mentioned transmission conditions and the worst cases, where the apparatus cannot be operated by the rainfall or the like, can be avoided.

Further, since the encoding ratio C and the data compressing ratio R are combined to form a group and the transmitting speed is selected to be constant, for example, 24 Mbps in any of the groups, the characteristics of the apparatus from the transmitting circuit 15 to the receiving circuit 22 need not be varied in response to the transmitting conditions and can be commonly used under all transmission conditions. Therefore, the scale of the apparatus can be reduced, and particularly in the transmitting apparatus 1, not only the transmitting circuit 15 but also a power supply source apparatus (not shown) can be made compact in size and made light in weight. Thus, the transmitting apparatus 1 and the power supply source can be transported or installed at a news source spot with ease.

Having described a preferred embodiment of the invention with reference to the accompanying drawings, it is to be understood that the invention is not limited to that precise embodiment of the invention and that various changes and modifications could be effected by one skilled in the art without departing from the spirit or scope of the novel concepts of the invention as defined in the appended claims.

I claim as my invention:

1. A method of transmitting data comprising the steps of:

(a) compressing the data in accordance with a compressing ratio, to generate compressed data;

(b) convolutionally encoding the compressed data in accordance with a code having an encoding ratio, to generate convolutionally encoded, compressed data;

(c) transmitting the convolutionally encoded, compressed data at a pre-determined transmitting speed;

(d) receiving the convolutionally encoded, compressed data;

(e) Viterbi decoding the convolutionally encoded, compressed data;

(f) expanding the Viterbi decoded data, to generate expanded data;

(g) generating control signals indicative of an error condition of the expanded data; and (h) varying the compressing ratio and the encoding ratio in response to the control signals without significantly varying the transmitting speed.

2. The method of claim 1, wherein steps (a), (b), and (h) are performed at a first station, steps (d), (e), (f) and (g) are performed at a second station, step (c) comprises transmitting the data from the first station to the second station via a satellite, and also including the step of:

after step (g) and before step (h), supplying the control signals to the first station.

3. An apparatus for transmitting data, comprising:

compressing means for compressing data according to a compressing ratio, to generate compressed data;

encoding means for convolutionally encoding the compressed data according to an encoding ratio, to generate convolutionally encoded, compressed data;

transmitting means for transmitting the convolutionally encoded, compressed data at a pre-determined transmitting speed;

receiving means for receiving the convolutionally encoded, compressed data;

decoding means for Viterbi decoding the convolutionally encoded, compressed data;

expanding means for expanding the Viterbi decoded data to generate expanded data; and means for generating control signals indicative of an error condition of the expanded data and supplying said control signals to the compressing means and the encoding means, wherein the compressing means and the encoding means vary the compressing ratio and the encoding ratio in response to the control signals while the transmitting means maintains the transmitting speed at a substantially constant value.

4. The apparatus of claim 3, wherein the transmitting means comprises a satellite data transmission network.

* * * * *